US011511755B2

(12) United States Patent
Inoue

(10) Patent No.: US 11,511,755 B2
(45) Date of Patent: *Nov. 29, 2022

(54) AROUSAL SUPPORT SYSTEM AND AROUSAL SUPPORT METHOD

(71) Applicant: TOYOTA JIDOSHA KABUSHIKI KAISHA, Toyota (JP)

(72) Inventor: Atsushi Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 439 days.

This patent is subject to a terminal disclaimer.

(21) Appl. No.: 16/720,063

(22) Filed: Dec. 19, 2019

(65) Prior Publication Data

US 2020/0122733 A1 Apr. 23, 2020

Related U.S. Application Data

(63) Continuation of application No. 15/996,879, filed on Jun. 4, 2018, now Pat. No. 10,525,980.

(30) Foreign Application Priority Data

Jun. 7, 2017 (JP) .............................. JP2017-112741

(51) Int. Cl.
*B60W 40/08* (2012.01)
*G08B 21/06* (2006.01)
(Continued)

(52) U.S. Cl.
CPC .......... *B60W 40/08* (2013.01); *B60K 28/066* (2013.01); *G05D 1/0061* (2013.01); *G05D 1/027* (2013.01);
(Continued)

(58) Field of Classification Search
CPC ......... B60W 40/08; B60W 2040/0827; B60W 2040/089; B60W 2540/21;
(Continued)

(56) References Cited

U.S. PATENT DOCUMENTS 6,236,968 B1 5/2001 Kanevsky et al.
6,575,902 B1* 6/2003 Burton ................... G08B 21/06
600/595
(Continued)

FOREIGN PATENT DOCUMENTS

JP 2001-163080 A 6/2001
JP 2006-279796 A 10/2006
(Continued)

OTHER PUBLICATIONS

May 9, 2019 Office Action issued in U.S. Appl. No. 15/996,879.
U.S. Appl. No. 15/996,879, filed Jun. 4, 2018 in the name of Inoue et al.

*Primary Examiner* — Huyen X Vo
(74) *Attorney, Agent, or Firm* — Oliff PLC

(57) ABSTRACT

An arousal support device including a processor programmed to output a dialogue speech in a form of a question, and obtain response speech which is a response of a driver to the dialogue speech; measure a response time from when the dialogue speech is output till the response speech is obtained; store the measured response time in a database; derive an estimated value of wakefulness of the driver based on the measured response time and a plurality of response times previously stored in the database; and output a signal corresponding to the estimated value to provide arousal support.

20 Claims, 8 Drawing Sheets

(51) Int. Cl.
  *B60K 28/06* (2006.01)
  *G05D 1/00* (2006.01)
  *G05D 1/02* (2020.01)
  *G08B 25/08* (2006.01)

(52) U.S. Cl.
  CPC ............. *G08B 21/06* (2013.01); *G08B 25/08* (2013.01); *B60W 2040/089* (2013.01); *B60W 2040/0827* (2013.01); *B60W 2540/21* (2020.02); *B60W 2540/30* (2013.01); *G05D 2201/0213* (2013.01)

(58) Field of Classification Search
  CPC . B60W 2540/30; B60K 28/066; B60K 28/06; G05D 1/0061; G05D 1/00; G05D 1/027; G05D 1/02; G05D 2201/0213; G01C 21/165; G01C 21/3629; G01C 21/36; G01C 21/3679; G08B 21/06; G08B 13/19658; G08B 21/0286; G08B 25/016; G08B 25/08; B60Q 9/00; G10L 13/00; G10L 15/22
  See application file for complete search history.

(56) References Cited

U.S. PATENT DOCUMENTS

| 9,878,663 | B1* | 1/2018 | Kochura | ............... B60W 40/08 |
| 2007/0024454 | A1 | 2/2007 | Singhal | |
| 2018/0157980 | A1 | 6/2018 | Kochura et al. | |

FOREIGN PATENT DOCUMENTS

| JP | 2008-225537 A | 9/2008 |
| JP | 2009-098937 A | 5/2009 |

* cited by examiner

FIG. 3A

| CAUTION-NEEDED OPERATION | POINTS DEDUCTED |
|---|---|
| SUDDEN BRAKING (NORMAL ROAD) | -4 |
| SUDDEN BRAKING (WHEN TURNING RIGHT OR LEFT) | -8 |
| SUDDEN STEERING | -4 |
| LANE DEPARTURE (ONCE) | -1 |
| FAILURE TO STOP AT STOP SIGN | -8 |
| WRONG-WAY DRIVING | -10 |
| TRAVELING STRAIGHT FOR 30 SEC. OR LONGER WHILE RIGHT/LEFT TURN LAMP IS ON | -6 |
| TRAVELING FOR 30 SEC. OR LONGER WHILE HAZARD LAMPS ARE ON | -6 |

FIG. 3B

| ELAPSED TIME FROM TIME OF OCCURRENCE | COEFFICIENT |
|---|---|
| 5 MIN. ELAPSED | 0.9 |
| 8 MIN. ELAPSED | 0.7 |
| 15 MIN. ELAPSED | 0.5 |
| 30 MIN. ELAPSED | 0.3 |
| 40 MIN. ELAPSED | 0 |

FIG. 7

| NORMAL OPERATION | POINTS ADDED |
|---|---|
| SLOW DECELERATING OPERATION | +1 |
| RIGHT OR LEFT TURNING WITH RIGHT/ LEFT TURN LAMP NORMALLY TURNED ON | +1 |
| NO LANE DEPARTURE FOR GIVEN PERIOD OF TIME | +1 |

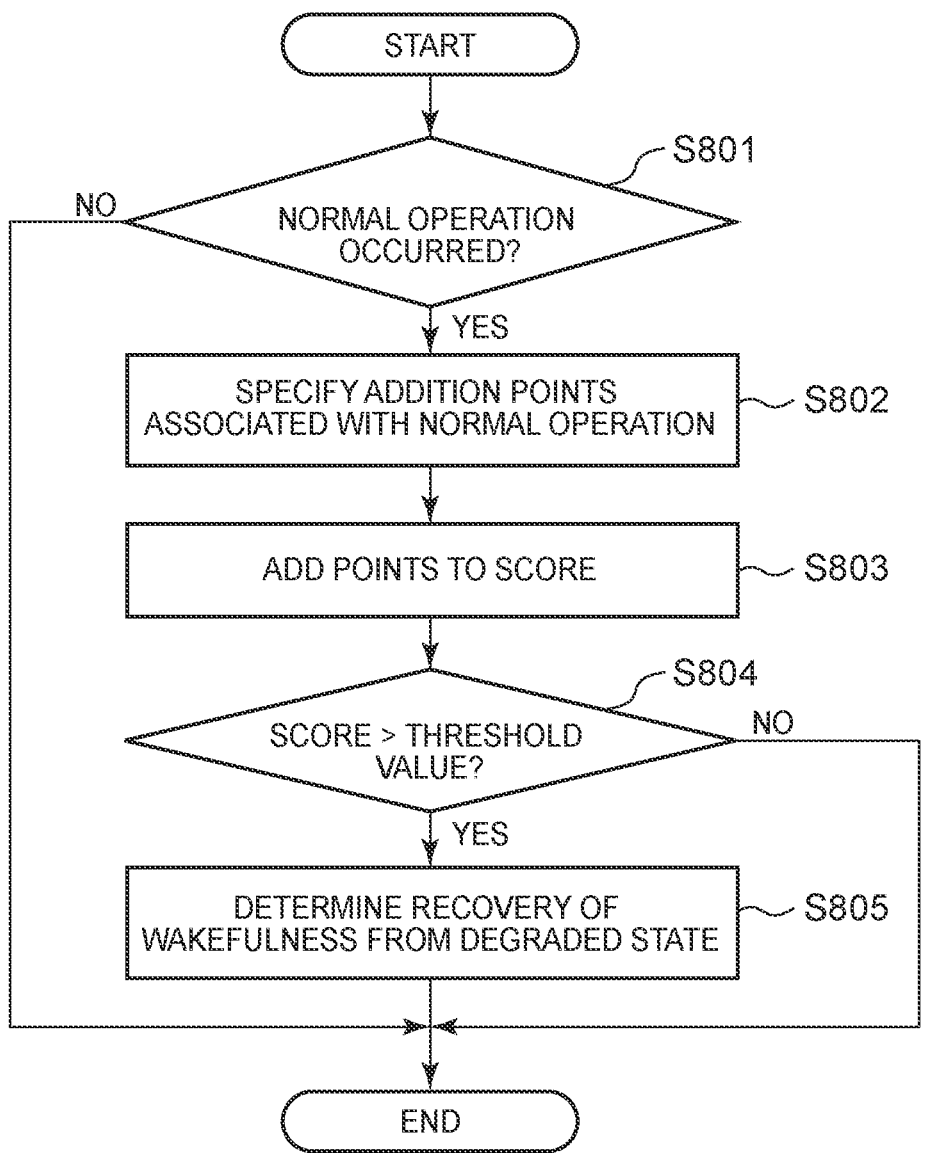

AROUSAL SUPPORT SYSTEM AND AROUSAL SUPPORT METHOD

INCORPORATION BY REFERENCE

This application is a Continuation of U.S. patent application Ser. No. 15/996,879 filed Jun. 4, 2018, which claims the benefit of Japanese Patent Application No. 2017-112741 filed on Jun. 7, 2017. The disclosures including the specification, drawings and abstract of the prior applications are hereby incorporated by reference herein in their entireties.

BACKGROUND

1. Technical Field

The disclosure relates to an arousal support system and an arousal support method.

2. Description of Related Art

In the related art, drowsy driving prevention systems for vehicles are known which uses technologies for calling the driver's attention by means of sound or light, when drowsy driving of the driver is detected. One type of the drowsy driving prevention system makes an inquiry by voice to the driver, and detects drowsy driving (representing degradation of wakefulness of the driver), when no response from the driver is detected for a given period of time.

For example, according to a technology disclosed in Japanese Patent Application Publication No. 2001-163080 (JP 2001-163080 A), the system starts making an inquiry by voice to the driver when the vehicle travels for a given period of time or longer, and determines that the driver is highly likely to doze off, when there is no response from the driver for a given period of time since the inquiry is started, to initiate guidance for prevention of drowsy driving.

SUMMARY

However, according to the technology of JP 2001-163080 A, the given period of time as a criterion based on which the inquiry by voice to the driver is started, and the given period of time as a criterion based on which the guidance for prevention of drowsy driving is started are fixed, and common to an unspecified number of people. Therefore, the guidance for prevention of drowsy driving may be started, even in a situation where the driver actually does not feel drowsiness at all, and there is some room for improvement in terms of the accuracy in detection of drowsy driving.

The disclosure provide an arousal support system that estimates a wakefulness level of a driver with high accuracy, by an estimating method suitable for a personal difference of the driver.

An arousal support system according to a first aspect of the disclosure includes a dialogue processing unit configured to output a dialogue speech in a form of a question, and obtain response speech which is a response of a driver to the dialogue speech; a response time measuring unit configured to measure a response time from the dialogue processing unit outputs the dialogue speech till the dialogue processing unit obtains the response speech; a database storing the response time measured by the response time measuring unit; a statistic calculating unit configured to calculate a statistical value of the response time based on one or more response times stored in the database; and a first estimating unit configured to derive, based on the response time measured by the response time measuring unit and the statistical value calculated by the statistic calculating unit, an estimated value of wakefulness of the driver.

An arousal support system according to a second aspect of the disclosure includes: an electronic control unit configured to: output a dialogue speech in a form of a question; obtain response speech which is a response of a driver to the dialogue speech; measure a response time from the dialogue speech is output till the response speech is obtained; store the response time; calculate a statistical value of the response time based on one or more stored response times; derive an estimated value of wakefulness of the driver, based on the measured response time and the calculated statistical value; and output a signal corresponding to the estimated value.

An arousal support method according to a third aspect of the disclosure includes outputting a dialogue speech in a form of a question; obtaining response speech which is a response of a driver to the dialogue speech; measuring a response time from the dialogue speech is output till the response speech is obtained; storing the response time; calculating a statistical value of the response time based on one or more stored response times; and deriving an estimated value of wakefulness of the driver based on the measured response time and the calculated statistical value.

According to the aspects as described above, the estimated value of the wakefulness of the driver is derived, based on the statistical value calculated based on the past response times of the driver himself/herself. The past response times of the driver himself/herself accurately reflects differences in the way to respond to questions among individual drivers. Accordingly, with this configuration, the wakefulness level of the driver can be estimated with high accuracy.

In the above aspect, the statistic calculating unit may be configured to calculate an average response time of a plurality of response times stored in the database.

In the above aspect, the arousal support system may further include a specified word extracting unit configured to extract a specified word included in the response speech; and a second estimating unit configured to derive an estimated value of the wakefulness of the driver, based on a result of extraction of the specified word by the specified word extracting unit.

With the above configuration, the wakefulness level of the driver is estimated, from the content of the response speech actually uttered by the driver. The content of the response speech uttered by the driver accurately represents the current state (wakefulness) of the driver expressed by the driver himself/herself. Accordingly, the wakefulness level of the driver can be estimated with high accuracy.

In the above aspect, a plurality of the dialogue speeches may be classified into a plurality of dialogue speech groups, according to a length of an assumed response time; and when the dialogue speech belonging to one of the plurality of dialogue speech groups is output to the driver, the statistic calculating unit may be configured to calculate the statistical value of the response time, based on the response time obtained and stored in the database when the dialogue speech belonging to the one of the plurality of dialogue speech groups was output to the driver in a past.

With the above configuration, the estimated value of the wakefulness of the driver is derived, based on the statistical value calculated based on the appropriate past response times corresponding to the content of the question. Accordingly, the wakefulness level of the driver can be estimated with high accuracy.

It is thus possible to estimate the wakefulness level of the driver with high accuracy, by the estimating method suitable for the personal difference of the driver.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A is a view showing one example of a table referred to by the navigation device (wakefulness degradation detecting unit) according to the embodiment;

FIG. 3B is a view showing one example of a table referred to by the navigation device (wakefulness degradation detecting unit) according to the embodiment;

FIG. 7 is a view showing one example of a table referred to by the navigation device (wakefulness recovery detecting unit) according to the embodiment; and FIG. 8 is a flowchart illustrating the procedure of wakefulness recovery detecting operation performed by the navigation device (wakefulness recovery detecting unit) according to the embodiment.

DETAILED DESCRIPTION OF EMBODIMENTS

An arousal support system according to one embodiment of the disclosure will be described with reference to the drawings.

System Configuration of Arousal Support System 10

Figure 1:
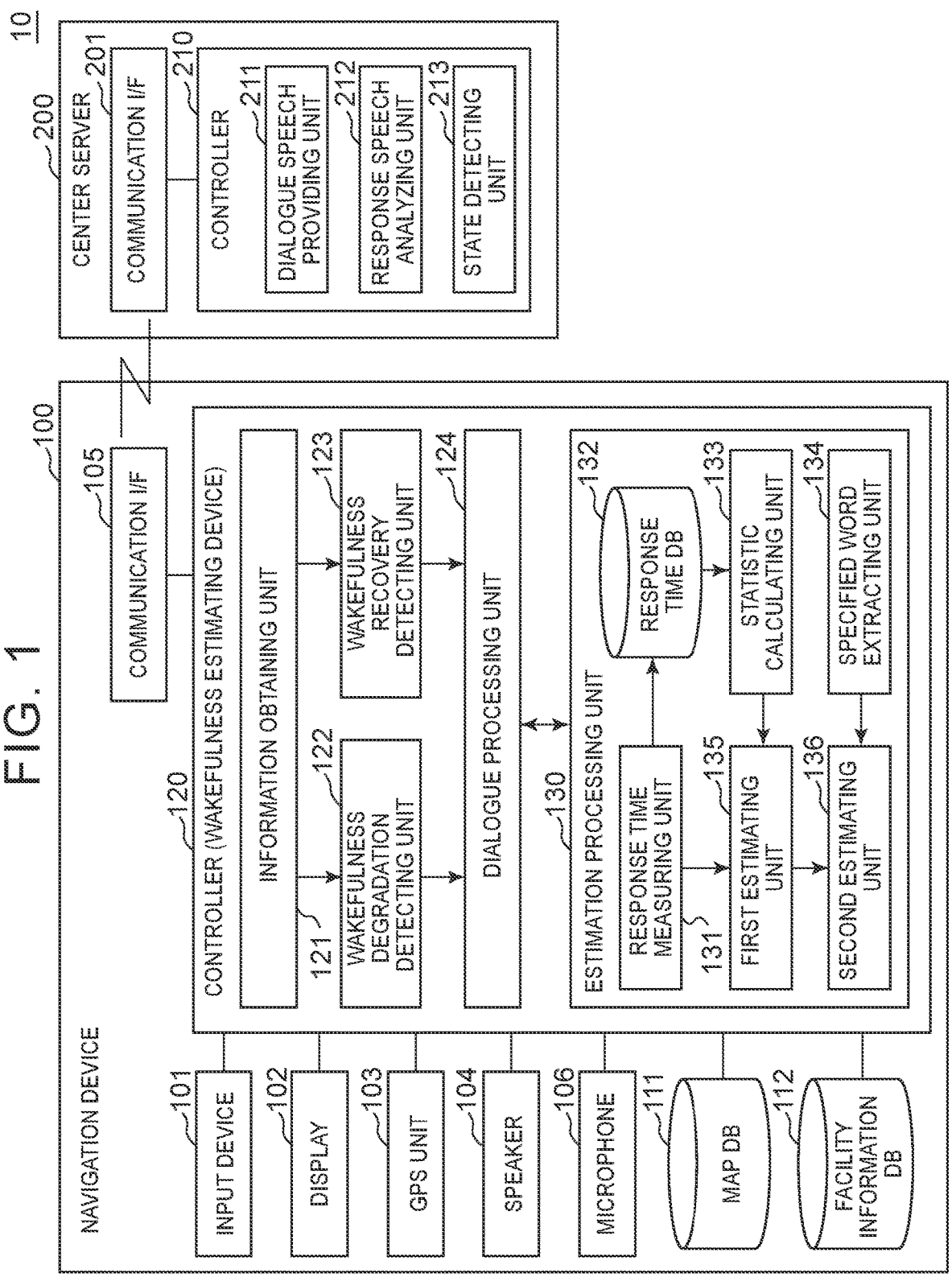
FIG. 1 is a view showing the system configuration of an arousal support system according to one embodiment.

FIG. 1 shows the functional configuration of the arousal support system 10 according to the embodiment. The arousal support system 10 shown in FIG. 1 includes a navigation device 100 and a center server 200. The arousal support system 10 offers arousal support service to a driver of a vehicle, such as an automobile. The arousal support service is provided when degradation of wakefulness of the driver is detected, for promoting wakefulness of the driver, by outputting dialogue speech in the form of questions to the driver, utilizing dialogue service offered by the center server 200. In particular, the arousal support service of this embodiment makes it possible to estimate a wakefulness level of the driver with high accuracy, through dialogue with the driver. The wakefulness level of the driver estimated with the arousal support service is transmitted, for example, to various processing units (e.g., a processing unit that encourages the driver to take a break, based on the wakefulness level, a processing unit that performs logging of the wakefulness level, etc.) included in the vehicle.

Center Server 200

The center server 200 offers dialogue service to the navigation device 100, when the arousal support service is utilized by the navigation device 100. The dialogue service is to offer dialogue speech data representing dialogue speech directed to the driver, to the navigation device 100.

The center server 200 is installed in a facility (e.g., a facility managed by a dialogue service provider) outside the vehicle. The center server 200 is able to send and receive various types of data (e.g., dialogue speech data, response speech data, etc.) to and from the navigation device 100, via wireless communications (e.g., Wi-Fi (registered trademark), etc.) between the center server 200 and the navigation device 100.

As shown in FIG. 1, the center server 200 includes a communication I/F (interface) 201, and a controller 210.

The communication I/F 201 controls communications with the navigation device 100 via wireless communications, so as to send and receive various types of data to and from the navigation device 100. For example, the communication I/F 201 receives a request for acquisition of dialogue speech data directed to the driver, from the navigation device 100. The communication I/F 201 also sends dialogue speech data directed to the driver and supplied from a dialogue speech providing unit 211, to the navigation device 100, for example. The communication I/F 201 also receives speech recognition result data (speech text) of response speech of the driver, from the navigation device 100, for example.

The controller 210 performs operation to offer dialogue service to the navigation device 100. As shown in FIG. 1, the controller 210 includes, as its functions, the dialogue speech providing unit 211, response speech analyzing unit 212, and a state detecting unit 213.

When a request for acquisition of dialogue speech directed to the driver is received via the communication I/F 201, the dialogue speech providing unit 211 provides dialogue speech data directed to the driver, to the navigation device 100. For example, the dialogue speech providing unit 211 may provide dialogue speech data of a first dialogue speech group to which the assumed response time is relatively short, and dialogue speech data of a second dialogue speech group to which the assumed response time is relatively long, as will be illustrated below.

Examples of dialogue speech data of first dialogue speech group are as follows.

"Would you like to talk a little with me?"

"There is a traffic jam ahead. Would you like to search for a route to avoid it?"

"The fuel is getting short. Would you like to search for a gas station?"

Examples of dialogue speech data of the second dialogue speech group are as follows.

"What did you have for lunch today?"

"What is the movie you watched most recently?"

"Where would you like to go for a trip?"

When the recognition result data (speech text) of the response speech of the driver is received via the communication I/F 201, the response speech analyzing unit 212 analyzes the response speech of the driver, based on the recognition result data. More specifically, the response speech analyzing unit 212 performs known parsing (or syntax analysis) operation and intention understanding operation (specified word extracting operation), on the recognition result data (speech text) of the response speech of the driver.

For example, the analysis result obtained by the response speech analyzing unit 212 is fed back to the dialogue speech providing unit 211. As a result, the dialogue speech providing unit 211 can derive the next, more suitable dialogue speech (more conversational dialogue speech), according to the content of the response of the driver.

Also, for example, the analysis result obtained by the response speech analyzing unit 212 is fed back to an appropriate processing unit of the navigation device 100, according to the content of the question and the content of the driver's response. For example, if the question is: "There is a traffic jam ahead. Would you like to search for a rout to avoid it?", and the driver's response is "Yes.", the analysis result obtained by the response speech analyzing unit 212 is fed back to a route searching unit of the navigation device 100. As a result, the route searching unit of the navigation device 100 will search for the route to avoid the traffic jam.

When the recognition result data (speech text) of the response speech of the driver is received via the communication I/F 201, the state detecting unit 213 detects the state (e.g., tension level, stress level, etc.) of the driver, based on the recognition result data, by a known method (for example, by detecting a specified word or words from the speech text). For example, the detection result obtained by the state detecting unit 213 is fed back to the dialogue speech providing unit 211. As a result, the dialogue speech providing unit 211 can derive the next, more suitable dialogue speech, according to the state of the driver.

The controller 210 includes hardware, such as CPU (Central Processing Unit), main storage devices (e.g., ROM (Read Only Memory), RAM (Random Access Memory), etc.), and auxiliary storage devices (e.g., HDD (Hard Disk Drive), flash memory, etc.). Each function of the controller 210 as described above is implemented when the CPU (computer) executes a corresponding program stored in the main storage device or auxiliary storage device, for example.

The center server 200 may consist of a physically single information processing unit, or physically two or more information processing units. In the latter case, the two or more information processing units may be connected to each other via a network.

Navigation System 100

The navigation device 100 is installed on the vehicle. The navigation device 100 has a function of "arousal support system", as well as functions (e.g., a route searching function, route guidance function, etc.) of a general navigation device. The navigation device 100 can send and receive various types of data (e.g., dialogue speech data, response speech data, recognition result data of response speech, etc.) to and from the center server 200, via wireless communication lines (e.g., a mobile telephone network having a base station at a terminal, Wi-Fi, etc.) between the navigation device 100 and the center server 200.

As shown in FIG. 1, the navigation device 100 includes an input device 101, display 102, GPS (Global Positioning System) unit 103, speaker 104, communication I/F 105, microphone 106, map DB 111, facility information DB 112, and a controller 120.

The input device 101 is used when the user enters various types of information. Examples of the input device 101 include a touch panel, operation button, cross key, and so forth. The display 102 is a device on which various types of information are displayed. Examples of the display 102 include a liquid crystal display, organic EL (Electro Luminescence) display, and so forth.

The GPS unit 103 detects the current location (the longitude and the latitude) of the navigation device 100, based on a GPS signal received from a GPS satellite. The speaker 104 outputs various types of speech (for example, dialogue speech directed to the driver, etc.).

The communication I/F 105 controls communications with the center server 200 via wireless communications, so as to send and receive various types of data to and from the center server 200. For example, the communication I/F 105 sends a request for acquisition of dialogue speech data directed to the driver, to the center server 200. The communication I/F 105 also receives dialogue speech data directed to the driver and supplied from the center server 200 (dialogue speech providing unit 211), for example. The communication I/F 105 also sends speech recognition result data (speech text) of response speech of the driver, to the center server 200, for example.

The microphone 106 is mounted in the vicinity of the driver's seat in the cabin, and is used for entering voice generated from the driver. As the microphone 106, a microphone incorporated in the main body of the navigation device 100, an external microphone provided separately from the main body of the navigation device 100, or the like, may be used.

The map DB 111 stores map data. The map data includes a plurality of pieces of node data and a plurality of pieces of link data. Each piece of the node data corresponds to an intersection. Each piece of the link data corresponds to a road section between two nodes.

The facility information DB 112 stores information on a plurality of facilities. For example, the information on each facility includes the name of the facility, positional information (the longitude and latitude), category, address, postal code, telephone number, detailed comment, image, and so forth.

The controller 120 implements the function of the "arousal support system", and controls processing on the navigation device 100 side, when the arousal support service is used from the navigation device 100. As shown in FIG. 1, the controller 120 includes an information obtaining unit 121, wakefulness degradation detecting unit 122, wakefulness recovery detecting unit 123, dialogue processing unit 124, and an estimation processing unit 130.

The information obtaining unit 121 obtains vehicle information concerning the vehicle driven by the driver, and road information concerning the road on which the vehicle is traveling. More specifically, the information obtaining unit 121 obtains the vehicle information and road information for determining occurrence of a certain event (caution-needed operation (generally, operation against which it is preferable to caution the driver) and normal operation) for detecting wakefulness degradation of the driver. The vehicle information and road information obtained by the information obtaining unit 121 may be selected from vehicle information and road information as indicated below, for example, (but not limited to these items of vehicle information and road information). These items of vehicle information may be obtained from, for example, various ECUs (Electronic Control Units) installed on the vehicle, various sensors, and so forth. Also, these items of road information may be obtained from, for example, the map DB 111, and so forth.

Examples of the vehicle information obtained by the information obtaining unit 121 include a vehicle speed signal, accelerator pedal position signal, brake signal, steering angle signal, acceleration sensor output signal, output signal from a lane departure warning system, turn-signal lighting signal, vehicle traveling direction information, and driving time. Example of the road information obtained by the information obtaining unit 121 include a one-way traffic information, speed limit, stop sign information, and curve information.

The wakefulness degradation detecting unit 122 detects wakefulness degradation of the driver, based on the vehicle information and road information obtained by the information obtaining unit 121. More specifically, the wakefulness degradation detecting unit 122 determines occurrence of a given caution-needed operation concerning traveling of the vehicle, based on the vehicle information and road information obtained by the information obtaining unit 121. Then, the wakefulness degradation detecting unit 122 performs point deduction on a score, using the number of deduction points associated with the given caution-needed operation. The score provides a basis on which wakefulness degradation of the driver is detected by the wakefulness degradation detecting unit 122, and also provide a basis on which recovery of the driver's wakefulness is detected by the wakefulness recovery detecting unit 123. The initial value of the score is set to "0", for example. When the score is equal to or lower than "−10", the wakefulness degradation detecting unit 122 determines that "the wakefulness of the driver has degraded". Examples of the caution-needed operation and the number of points deducted will be described later, using FIG. 3A and FIG. 3B. Details of wakefulness degradation detecting operation performed by the wakefulness degradation detecting unit 122 will be described later, using FIG. 4.

After wakefulness degradation of the driver is detected by the wakefulness degradation detecting unit 122, the wakefulness recovery detecting unit 123 detects recovery of the driver's wakefulness from its degraded state, based on the vehicle information and road information obtained by the information obtaining unit 121. More specifically, the wakefulness recovery detecting unit 123 determines occurrence of given normal operation concerning traveling of the vehicle, based on the vehicle information and road information obtained by the information obtaining unit 121. Then, the wakefulness recovery detecting unit 123 performs point addition on the score, using the number of points associated with the given normal operation. Then, the wakefulness recovery detecting unit 123 determines that "the driver's wakefulness has recovered from the degraded state", when the score exceeds a predetermined threshold value (which is equal to "0" as the initial value, for example, but not limited to "0"). Examples of the given normal operation and the number of points added will be described later, using FIG. 7. Details of wakefulness recovery detecting operation performed by the wakefulness recovery detecting unit 123 will be described later, using FIG. 8.

The dialogue processing unit 124 has a speech dialogue with the driver. More specifically, the dialogue processing unit 124 initially sends a request for acquisition of dialogue speech data directed to the driver, to the center server 200. Thus, the dialogue processing unit 124 obtains dialogue speech data directed to the driver, from the center server 200. Then, the dialogue processing unit 124 causes the speaker 104 to output dialogue speech based on the dialogue speech data. Subsequently, the dialogue processing unit 124 obtains response speech of the driver entered via the microphone 106. Then, the dialogue processing unit 124 performs speech recognition processing on the response speech, so as to generate speech text of the response speech. Further, the dialogue processing unit 124 transmits the speech text created through speech recognition processing, to the center server 200.

When the wakefulness degradation detecting unit 122 detects wakefulness degradation of the driver, the dialogue processing unit 124 outputs dialogue speech as speech for interaction with the driver. When the wakefulness recovery detecting unit 123 detects recovery of the driver's wakefulness from the degraded state, after output of the dialogue speech, the dialogue processing unit 124 finishes output of the dialogue speech.

The estimation processing unit 130 includes a response time measuring unit 131, response time DB 132, statistic calculating unit 133, specified word extracting unit 134, first estimating unit 135, and a second estimating unit 136.

The response time measuring unit 131 measures a response time from the time when dialogue speech is output to the time when the driver responds to it with response speech. For example, the response time measuring unit 131 measures the response time from the time when the dialogue processing unit 124 outputs the dialogue speech, to the time when the dialogue processing unit 124 obtains the driver's response speech. For example, the response time measuring unit 131 can measure the response time, using the timer function included in the navigation device 100, or based on the system time of the navigation device 100.

Each time the response time is measured by the response time measuring unit 131, the response time thus measured is recorded in the response time DB 132. In this manner, the response time measured by the response time measuring unit 131 is accumulated in chronological order in the response time DB 132.

The statistic calculating unit 133 receives a plurality of response times recorded in the response time DB 132, and calculates the average response time of these response times. More specifically, the statistic calculating unit 133 receives the latest three response times recorded in the response time DB 132, with respect to each of two or more dialogue speech groups (in this embodiment, the first dialogue speech group and the second dialogue speech group), and calculates the average response time of these three response times. It is, however, to be noted that the plurality of response times is not limited to the latest three response times.

The specified word extracting unit 134 extracts a specified word or words included in the response speech of the driver, based on the speech text created through speech recognition processing by the dialogue processing unit 124. The specified words extracted by the specified word extracting unit 134 are preferably those words that suggest wakefulness degradation of the driver, and may be selected from the following words, for example, (but not limited to these words).

The specified words include, for example, "sleepy", "tired", "boring", "want to take a break", "heigh-ho", and "oh, man".

The first estimating unit 135 derives an estimated value of the driver's wakefulness, based on the response time measured by the response time measuring unit 131, and the average response time calculated by the statistic calculating unit 133. More specifically, when the response time measured by the response time measuring unit 131 is 1.8 times or more as long as the average response time calculated by the statistic calculating unit 133, the first estimating unit 135 derives an estimated value that indicates that "the wakefulness of the driver has degraded". In this connection, when the response time measured by the response time measuring unit 131 is the time it takes to respond to a question of the first dialogue speech group, the first estimating unit 135 derives the estimated value of the driver's wakefulness, based on the average response time of the first dialogue speech group calculated by the statistic calculating unit 133. On the other hand, when the response time measured by the response time measuring unit 131 is the time it takes to respond to a question of the second dialogue speech group, the first estimating unit 135 derives the estimated value of the driver's wakefulness, based on the average response time of the second dialogue speech group calculated by the statistic calculating unit 133.

The first estimating unit 135 may derive a degree of wakefulness of the driver as an estimated value, based on the response time measured by the response time measuring unit 131, and the average response time calculated by the statistic calculating unit 133. In this case, the first estimating unit 135 may determine the degree of wakefulness of the driver such that the degree of wakefulness becomes smaller as the response time measured by the response time measuring unit 131 is larger than the average response time calculated by the statistic calculating unit 133.

Also, the first estimating unit 135 may selectively derive one of predetermined two or more estimated values, based on the response time measured by the response time measuring unit 131, and the average response time calculated by the statistic calculating unit 133. In this case, the first estimating unit 135 may select one of the estimated values which indicates that the wakefulness level of the driver is lower, as the response time measured by the response time measuring unit 131 is larger than the average response time calculated by the statistic calculating unit 133.

The second estimating unit 136 derives an estimated value of the driver's wakefulness, based on the result of extraction of the specified words by the specified word extracting unit 134. More specifically, when the specified word extracting unit 134 extracts any specified word(s) a predetermined number of times or more (for example, twice or more during the past 15 min.) from the response speech, the second estimating unit 136 derives an estimating value indicating that "the driver's wakefulness has degraded".

The second estimating unit 136 may derive a degree of wakefulness of the driver as an estimated value, based on the result of extraction of the specified words by the specified word extracting unit 134. In this case, the second estimating unit 136 may determine the degree of wakefulness of the driver such that the degree of wakefulness becomes smaller as the number of the specified words extracted by the specified word extracting unit 134 is larger.

Also, the second estimating unit 136 may selectively derive one of predetermined two or more estimated values, based on the result of extraction of the specified words by the specified word extracting unit 134. In this case, the second estimating unit 136 may select one of the estimated values which indicates that the wakefulness level of the driver is lower, as the number of the specified words extracted by the specified word extracting unit 134 is larger.

The controller 120 outputs the estimated value of the driver's wakefulness derived by the first estimating unit 135, and the estimated value of the driver's wakefulness derived by the second estimating unit 136, to various processing units that need these estimated values. The controller 120 may individually output these two estimated values. Also, the controller 120 may calculate an estimated value to be output, by performing certain computation based on these estimated values, and output the estimated value thus calculated.

The controller 120 includes hardware, such as CPU, main storage devices (e.g., ROM, RAM, etc.), auxiliary storage devices (e.g., HDD, flash memory, etc.), and so forth. In the controller 120, each function of the controller 120 shown in FIG. 1 is implemented by the CPU (computer) when it executes a corresponding program stored in the main storage device or auxiliary storage device.

Each program executed by the CPU may be provided in a condition where it is installed in advance in the navigation device 100, or may be provided from the outside and loaded into the navigation device 100. In the latter case, the program may be provided via an external storage media (e.g., a USB memory, memory card, CD-ROM, etc.), or may be provided such that it is downloaded from a server on a network (e.g., Internet, etc.).

Procedure of Processing by Controller 120 of Navigation Device 100

Figure 2:
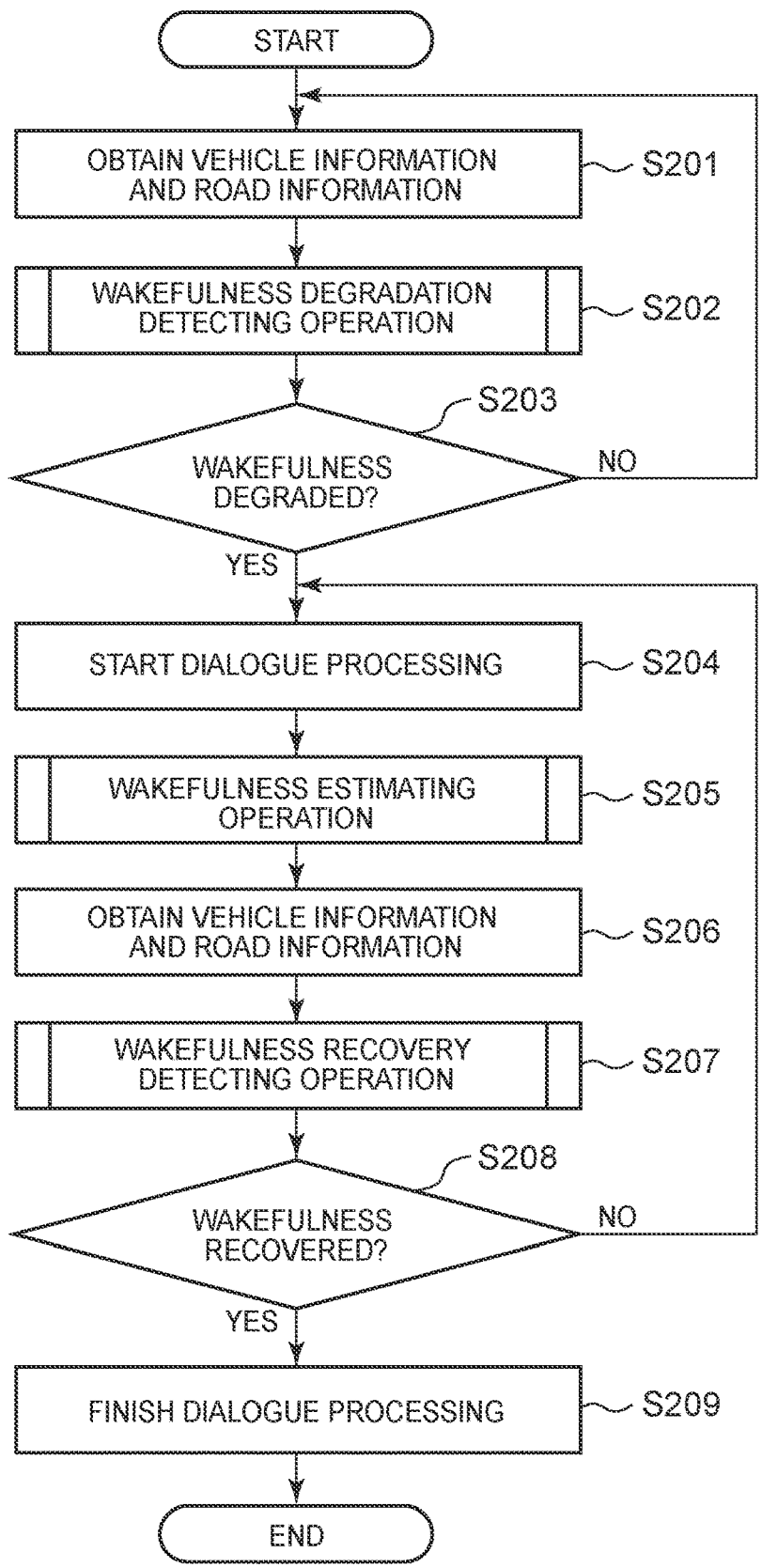
FIG. 2 is a flowchart illustrating the procedure of processing by a controller of a navigation device according to the embodiment.

FIG. 2 is a flowchart illustrating the procedure of processing performed by the controller 120 of the navigation device 100 according to the embodiment. A control routine shown in FIG. 2 is repeatedly executed by the navigation device 100, while the vehicle is traveling, for example.

Initially, the information obtaining unit 121 obtains vehicle information concerning the vehicle driven by the driver, and road information concerning the road on which the vehicle is traveling (step S201). Then, the wakefulness degradation detecting unit 122 performs wakefulness degradation detecting operation to detect wakefulness degradation of the diver, based on the vehicle information and road information obtained in step S201 (step S202). Details of the wakefulness degradation detecting operation performed by the wakefulness degradation detecting unit 122 will be described using FIG. 3A, FIG. 3B, and FIG. 4.

If no wakefulness degradation of the driver is detected in the wakefulness degradation detecting operation of step S202 (step S203: NO), the controller 120 returns to step S201. On the other hand, if wakefulness degradation of the driver is detected in the wakefulness degradation detecting operation of step S202 (step S203: YES), the dialogue processing unit 124 outputs dialogue speech as speech for interaction with the driver (step S204). Details of dialogue processing by the dialogue processing unit 124 will be described later, using FIG. 5.

Subsequently, the estimation processing unit 130 performs wakefulness estimating operation to estimate the wakefulness level of the driver (step S205). Details of the wakefulness estimating operation performed by the estimation processing unit 130 will be described later, using FIG. 6.

Also, the information obtaining unit 121 obtains vehicle information concerning the vehicle driven by the driver, and road information concerning the road on which the vehicle is traveling (step S206). Then, the wakefulness recovery detecting unit 123 performs wakefulness recovery detecting operation to detect recovery of the driver's wakefulness from its degraded state, based on the vehicle information and road information obtained in step S206 (step S207). Details of the wakefulness recovery detecting operation performed by the wakefulness recovery detecting unit 123 will be described later, using FIG. 7 and FIG. 8.

If no recovery of the driver's wakefulness from the degraded state is detected in the wakefulness recovery detecting operation of step S207 (step S208: NO), the controller 120 returns to step S204. On the other hand, if recovery of the driver's wakefulness from the degraded state is detected in the wakefulness recovery detecting operation of step S207 (step S208: YES), the dialogue processing unit 124 finishes output of the dialogue speech (step S209). Then, the controller 120 completes the routine shown in FIG. 2.

Examples of Tables Referred to by Wakefulness Degradation Detecting Unit 122

FIG. 3A and FIG. 3B show examples of tables referred to by the navigation device 100 (wakefulness degradation detecting unit 122) according to the embodiment. In a table 300 shown in FIG. 3A, the number of points deducted is set, for each of given caution-needed operations concerning traveling of the vehicle. In a table 310 shown in FIG. 3B, a coefficient by which the number of points deducted is to be multiplied is set, for each elapsed time from the time of occurrence of the given caution-needed operation. The tables 300, 310 are stored in advance in a memory included in the controller 120, for example. The tables 300, 310 are referred to by the wakefulness degradation detecting unit 122 of the navigation device 100, when wakefulness degradation of the driver is detected.

Procedure of Wakefulness Degradation Detecting Operation

Figure 4:
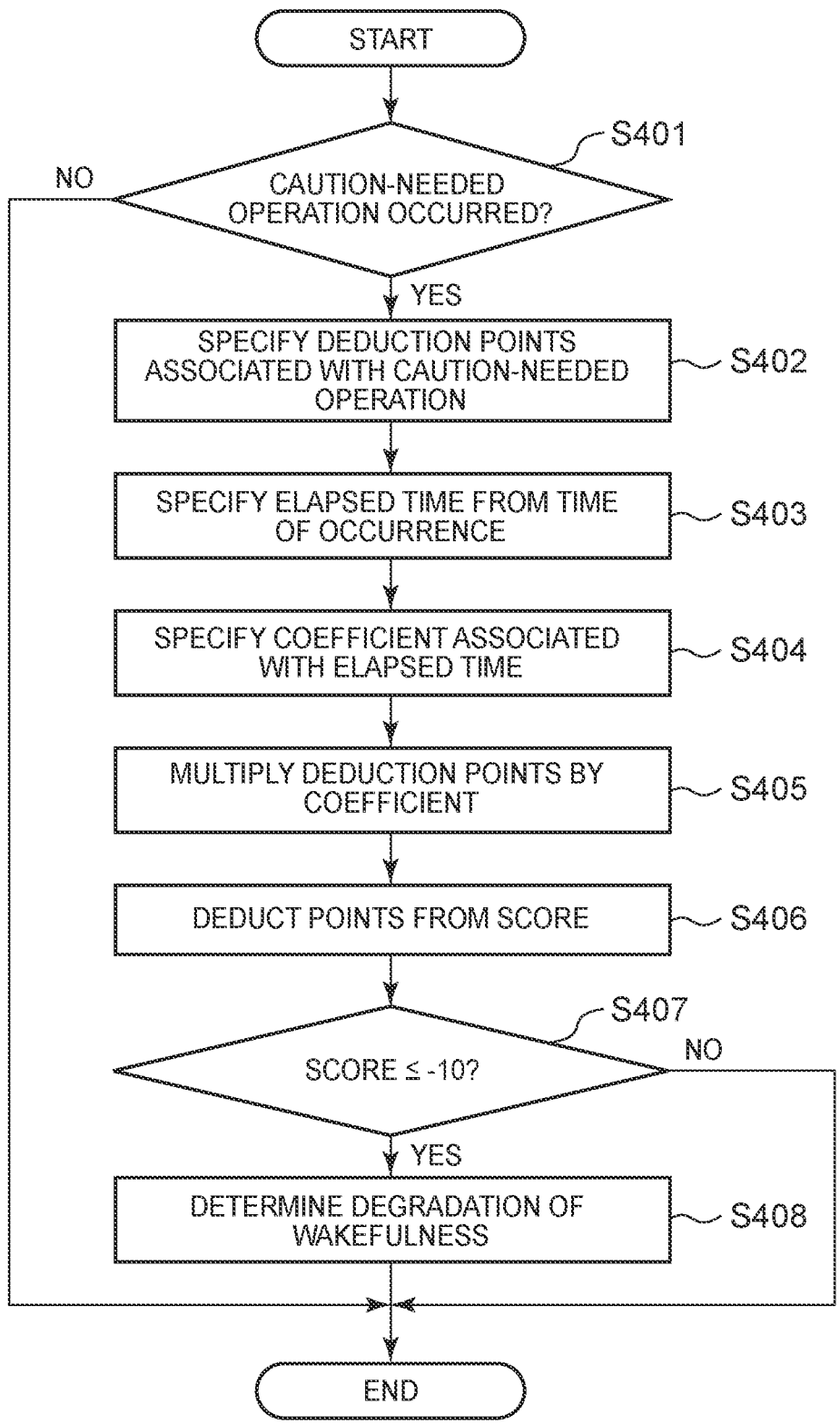
FIG. 4 is a flowchart illustrating the procedure of detecting operation performed by the navigation device (wakefulness degradation detecting unit) according to the embodiment.

FIG. 4 is a flowchart illustrating the procedure of the wakefulness degradation detecting operation performed by the navigation device 100 (wakefulness degradation detecting unit 122) according to the embodiment. Referring to FIG. 4, the processing content of the wakefulness degradation detecting operation (step S202) in the flowchart of FIG. 2 will be described in detail.

Initially, the wakefulness degradation detecting unit 122 determines occurrence of any of the caution-needed operations listed in the table 300, based on the vehicle information and road information obtained by the information obtaining unit 121 (step S401).

For example, the wakefulness degradation detecting unit 122 can determine occurrence of "sudden braking (normal road)", based on the vehicle speed signal, brake signal, acceleration sensor output signal, etc. Also, for example, the wakefulness degradation detecting unit 122 can determine occurrence of "sudden braking (when turning right or left)", based on the vehicle speed signal, brake signal, acceleration sensor output signal, steering signal, etc.

Also, for example, the wakefulness degradation detecting unit 122 can determine occurrence of "sudden steering", based on the steering signal, etc. Also, for example, the wakefulness degradation detecting unit 122 can determine occurrence of "lane departure (once)", based on an output signal from the lane departure warning system, etc.

Also, for example, the wakefulness degradation detecting unit 122 can determine occurrence of "failure to stop at stop sign", based on stop sign information, brake signal, vehicle speed signal, etc. Also, for example, the wakefulness degradation detecting unit 122 can determine occurrence of "wrong-way driving", based on one-way traffic information, information on the vehicle traveling direction, etc.

Also, for example, the wakefulness degradation detecting unit 122 can determine occurrence of "traveling straight for 30 sec. or longer while a right/left turn lamp is ON", based on the turn-signal lighting signal, steering signal, vehicle speed signal, etc. Also, for example, the wakefulness degradation detecting unit 122 can determine occurrence of "traveling for 30 sec. or longer while hazard lamps are ON", based on the turn-signal lighting signal, vehicle speed signal, etc.

If it is determined in step S401 that none of the caution-needed operations has occurred (step S401: NO), the wakefulness degradation detecting unit 122 finishes the current cycle of the routine shown in FIG. 4. On the other hand, if it is determined in step S401 that any of the caution-needed operations has occurred (step S401: YES), the wakefulness degradation detecting unit 122 specifies the number of points deducted, which is associated with the caution-needed operation specified in step S401, by referring to the table 300 of FIG. 3A (step S402). For example, when the specified caution-needed operation is "sudden braking (normal road)", the wakefulness degradation detecting unit 122 selects "−4 points" from the table 300 and specifies it as the number of points deducted. Also, for example, when the specified caution-needed operation is "sudden braking (when turning right or left)", the wakefulness degradation detecting unit 122 selects "−8 points" from the table 300, and specifies it as the number of points deducted.

The wakefulness degradation detecting unit 122 also specifies the elapsed time from the time of occurrence of the caution-needed operation specified in step S401 (step S403). The wakefulness degradation detecting unit 122 also specifies the coefficient associated with the elapsed time specified in step S403, by referring to the table 310 of FIG. 3B (step S404). The wakefulness degradation detecting unit 122 multiplies the deduction points specified in step S402, by the coefficient specified in step S404 (step S405). For example, when the elapsed time specified in step S403 is "5 min. elapsed", the wakefulness degradation detecting unit 122 selects "0.9" from the table 310 to specify it as the coefficient, and multiplies the deduction points specified in step S402, by this coefficient. Also, when the elapsed time specified in step S403 is "8 min. elapsed", the wakefulness degradation detecting unit 122 selects "0.7" from the table 310 to specify it as the coefficient, and multiplies the deduction points specified in step S402, by this coefficient.

Then, the wakefulness degradation detecting unit 122 reduces the score (the initial value=0), using the deduction points obtained after it is multiplied by the coefficient in step S405 (step S406). Further, the wakefulness degradation detecting unit 122 determines whether the score has been reduced to be equal to or lower than "−10", through the point deduction in step S406 (step S407).

If it is determined in step S407 that the score is not equal to or lower than "−10" (step S407: NO), the wakefulness degradation detecting unit 122 finishes the current cycle of the routine shown in FIG. 4. On the other hand, if it is determined in step S407 that the score is equal to or lower than "−10" (step S407: YES), the wakefulness degradation detecting unit 122 determines that "the wakefulness of the driver has degraded" (step S408). Then, the wakefulness degradation detecting unit 122 finishes the current cycle of the routine shown in FIG. 4.

Procedure of Dialogue Processing

Figure 5:
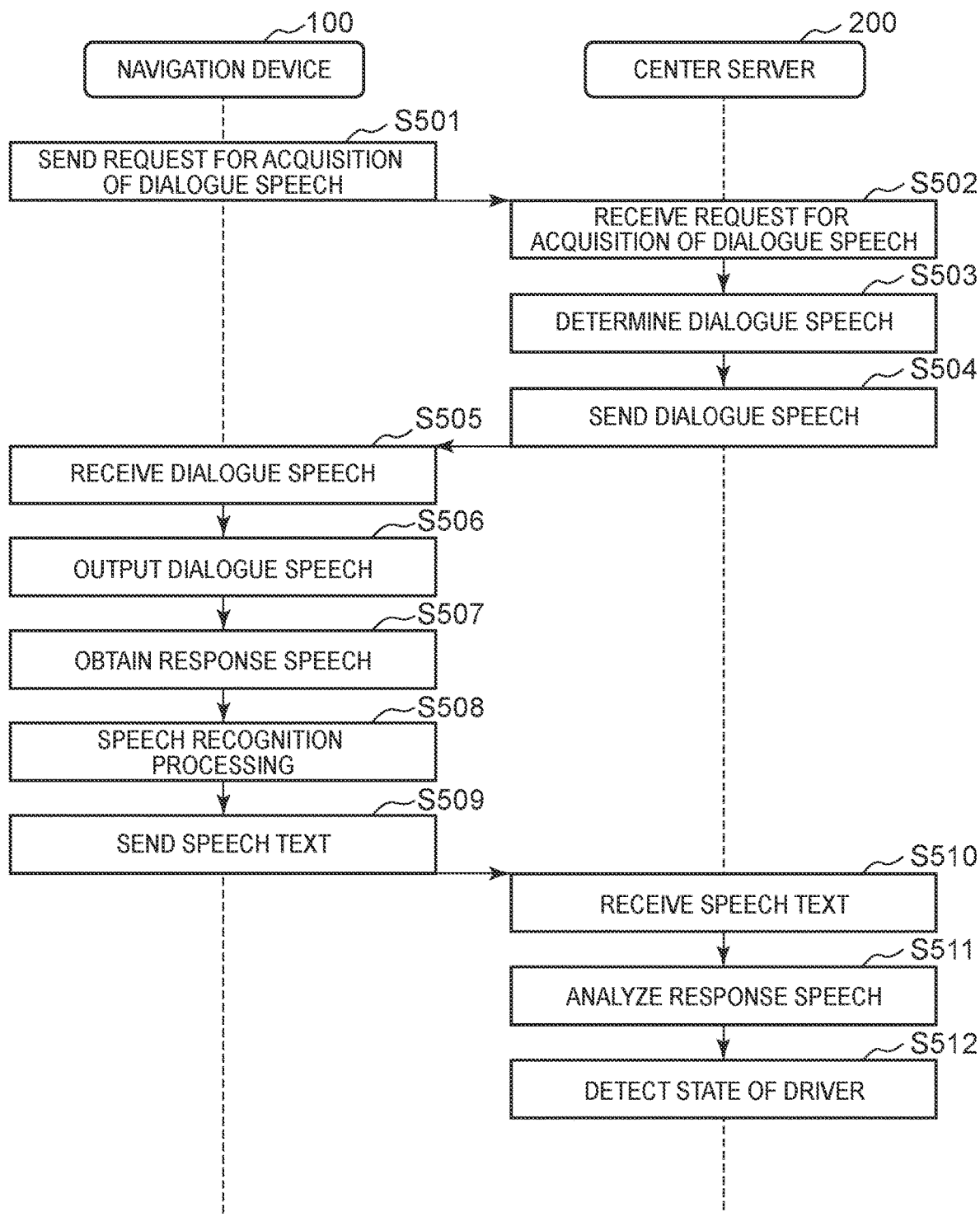
FIG. 5 is a flowchart illustrating the procedure of dialogue processing by the navigation device according to the embodiment and a center server.

FIG. 5 is a sequence diagram showing the procedure of dialogue processing performed by the navigation device 100 (dialogue processing unit 124) of the embodiment and the center server 200. Referring to FIG. 5, the content of dialogue processing started in the flowchart (step S204) of FIG. 2 will be described in detail.

Initially, in the navigation device 100, the dialogue processing unit 124 sends a request for acquisition of dialogue speech data directed to the driver, to the center server 200, via the communication I/F 105 (step S501).

In the center server 200, if the communication I/F 201 receives the acquisition request transmitted from the navigation device 100 (step S502), the dialogue speech providing unit 211 provides dialogue speech data directed to the driver (step S503). Then, the dialogue speech providing unit 211 sends the dialogue speech data provided in step S503, to the navigation device 100, via the communication I/F 201 (step S504).

In the navigation device 100, if the communication I/F 105 receives the dialogue speech data transmitted from the center server 200 (step S505), the dialogue processing unit 124 causes the speaker 104 to output dialogue speech based on the dialogue speech data (step S506).

Subsequently, if the dialogue processing unit 124 obtains response speech of the driver entered via the microphone 106 (step S507), the dialogue processing unit 124 performs speech recognition processing on the response speech, and creates speech text of the response speech (step S508). Further, the dialogue processing unit 124 sends the speech text created in step S508, to the center server 200 (step S509).

In the center server 200, if the communication I/F 201 receives the speech test transmitted from the navigation device 100 (step S510), the response speech analyzing unit 212 performs analytical processing on the speech text (step S511). Also, the state detecting unit 213 detects the state of the driver, based on the speech text (step S512).

In the processing of FIG. 5, the center server 200 may feed the result of analytical processing performed in step S511, and the state of the driver detected in step S512, back to the dialogue speech providing unit 211. Thus, the dialogue speech providing unit 211 can make the dialogue speech to be provided next, suitable for the content of the driver's response and the state of the driver.

Procedure of Wakefulness Estimating Operation

Figure 6:
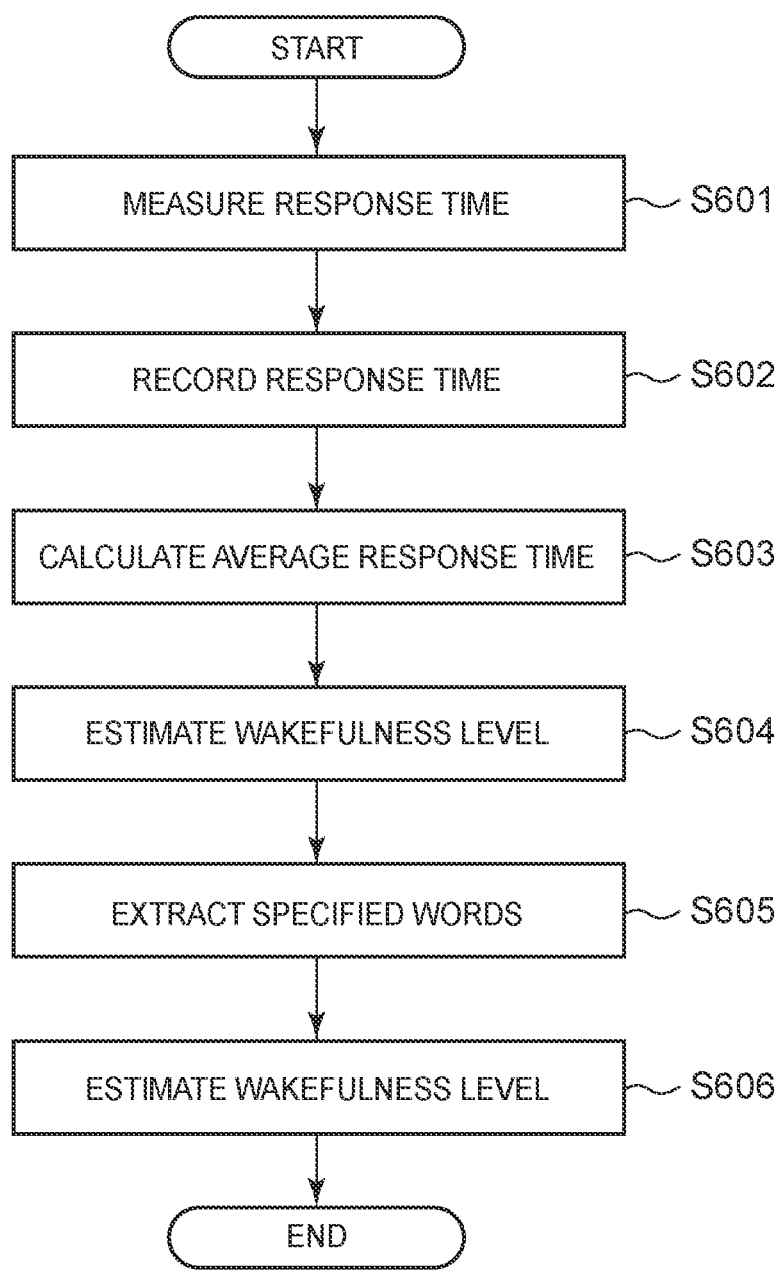
FIG. 6 is a flowchart illustrating the procedure of wakefulness estimating operation performed by the navigation device (estimating unit) according to the embodiment.

FIG. 6 is a flowchart illustrating the procedure of wakefulness estimating operation performed by the navigation device 100 (estimation processing unit 130) according to the embodiment. Referring to FIG. 6, the processing content of the wakefulness estimating operation (step S205) in the flowchart of FIG. 2 will be described in detail.

Initially, the response time measuring unit 131 measures the response time (the response time from the time when the dialogue speech directed to the driver is output, to the time when the response speech of the driver is obtained), in the dialogue processing performed by the dialogue processing unit 124 (step S601). Then, the response time measuring unit 131 records the response time measured in step S601, into the response time DB 132 (step S602).

Also, the statistic calculating unit 133 calculates the average time of a plurality of response times, based on the response times recorded in the response time DB 132 (step S603). Then, the first estimating unit 135 derives the estimated value of the driver's wakefulness, based on the response time measured in step S601, and the average response time calculated in step S603 (step S604).

Also, the specified word extracting unit 134 extracts a specified word or words included in the response speech of the driver, based on the result of speech recognition processing (speech text) of the response speech of the driver, which was created in the dialogue processing performed in the dialogue processing unit 124 (step S605). Then, the second estimating unit 136 derives the estimated value of the driver's wakefulness, based on the result of the extracting operation performed in step S605 (step S606). Then, the estimation processing unit 130 completes the wakefulness estimating operation shown in FIG. 6.

Example of Table Referred to by Wakefulness Recovery Detecting Unit 123

FIG. 7 shows one example of a table to which the navigation device 100 (wakefulness recovery detecting unit 123) according to the embodiment refers. In the table 700 shown in FIG. 7, the point to be added is set for each of given normal operations concerning traveling of the vehicle. The table 700 is stored in advance in a memory included in the controller 120, for example. Then, the table 700 is referred to by the wakefulness recovery detecting unit 123 of the navigation device 100, when it detects recovery of the driver from the state in which the wakefulness (level) is reduced.

Procedure of Wakefulness Recovery Detecting Operation

FIG. 8 is a flowchart illustrating the procedure of the wakefulness recovery detecting operation performed by the navigation device 100 (wakefulness recovery detecting unit 123) according to the embodiment. Referring to FIG. 8, the processing content of the wakefulness recovery detecting operation (step S207) in the flowchart of FIG. 2 will be described in detail.

Initially, the wakefulness recovery detecting unit 123 determines whether any of the normal operations indicated in the table 700 has occurred, based on the vehicle information and road information obtained by the information obtaining unit 121 (step S801).

For example, the wakefulness recovery detecting unit 123 can determine that "slow decelerating operation" has occurred, based on the vehicle speed signal, brake signal, acceleration sensor output signal, etc. Also, for example, the wakefulness recovery detecting unit 123 can determine that "right or left turning with right/left turn lamp normally turned on" has occurred, based on the turn-signal lighting signal, steering angle signal, vehicle speed signal, etc. Also, for example, the wakefulness recovery detecting unit 123 can determine that "no lane departure for a given period of time" has occurred, based on the output signal from the lane departure warning system, and so forth.

If it is determined in step S801 that none of the normal operations has occurred (step S801: NO), the wakefulness recovery detecting unit 123 finishes the current cycle of the routine shown in FIG. 8. On the other hand, if it is determined in step S801 that any of the normal operations has occurred (step S801: YES), the wakefulness recovery detecting unit 123 specifies the number of points to be added, which is associated with the normal operation specified in step S801, by referring to the table 700 of FIG. 7 (step S802). For example, when the specified normal operation is "slow decelerating operation", the wakefulness recovery detecting unit 123 selects "+1 point" from the table 700 and specifies it as the point added.

Then, the wakefulness recovery detecting unit 123 adds the points specified in step S802, to the score (step S803). Further, the wakefulness recovery detecting unit 123 determines whether the score to which the points have been added in step S803 exceeds a predetermined threshold value (step S804).

If it is determined in step S804 that the score does not exceed the predetermined threshold value (step S804: NO), the wakefulness recovery detecting unit 123 finishes the current cycle of the routine shown in FIG. 8. On the other hand, if it is determined in step S804 that the score exceeds the predetermined threshold value (step S804: YES), the wakefulness recovery detecting unit 123 determines that "the wakefulness of the driver has recovered from the degraded state" (step S805). Then, the wakefulness recovery detecting unit 123 finishes the routine shown in FIG. 8.

As described above, the navigation device 100 according to this embodiment can measure the response time required for the driver to respond by voice to dialogue speech, and derive the estimated value of the driver's wakefulness, based on the measured response time, and a statistical value calculated based on a history of the response time. With this configuration, the estimated value of the driver's wakefulness is derived, based on the statistical value calculated based on the past response times of the driver himself/herself. The past response times of the driver himself/herself accurately reflect individual differences in response to questions among drivers. Accordingly, the navigation device 100 according to this embodiment can estimate the wakefulness level of the driver with high accuracy.

Also, the navigation device 100 according to this embodiment can derive the estimated value of the driver's wakefulness, based on the result of extraction of the specified words included in the response speech from the driver. With this configuration, the wakefulness level of the driver is estimated, from the content of the response speech actually uttered by the driver. The content of the response speech uttered by the driver accurately reflects the current condition (wakefulness) of the driver himself/herself. Accordingly, the navigation device 100 according to this embodiment is able to estimate the wakefulness level of the driver with high accuracy.

Also, when a dialogue speech belonging to one of the two or more dialogue speech groups is output to the driver, the navigation device 100 according to this embodiment can calculate a statistical value of the response time, based on the history of the response time obtained when dialogue speeches of the above-indicated one dialogue speech group were output to the driver in the past. With this configuration, the estimated value of the driver's wakefulness is derived, based on the statistical value calculated based on the appropriate past response times corresponding to the content of the question. Accordingly, the navigation device 100 according to this embodiment can estimate the wakefulness level of the driver with high accuracy.

Also, when wakefulness degradation of the driver is detected based on the vehicle information, the navigation device 100 according to this embodiment can output dialogue speech as speech for interaction with the driver, and finish the output of the dialogue speech, when recovery of the driver's wakefulness from the degraded state is detected based on the vehicle information after the output of the dialogue speech. With this configuration, the navigation device 100 has a dialogue with the driver, while the wakefulness of the driver is actually degraded. Accordingly, the navigation device 100 according to this embodiment can appropriately adjust the period of time for which it has a dialogue with the driver, according to the state of the driver.

Also, each time occurrence of a given caution-needed operation is determined based on the vehicle information, the navigation device 100 according to this embodiment deducts points associated with the given caution-needed operation, from the score, and can detect wakefulness degradation of the driver when the score becomes equal to or lower than a predetermined threshold value. With this configuration, when certain caution-needed operation repeatedly occurs as the driver operates the vehicle, a dialogue with the driver is started. The caution-needed operation mentioned herein can occur in a condition where the wakefulness of the driver is degraded. Accordingly, the navigation device 100 according to this embodiment can appropriately adjust the start time of the dialogue with the driver, according to the state of the driver.

Also, each time occurrence of a given normal operation is determined based on the vehicle information, the navigation device 100 according to this embodiment adds points associated with the given normal operation, to the score, and can detect recovery of the driver's wakefulness from the degraded state when the score exceeds a predetermined threshold value. With this configuration, when certain normal operation repeatedly occurs as the driver operates the vehicle, the dialogue with the driver is finished. The normal operation mentioned herein can occur in a condition where the wakefulness of the driver has recovered. Accordingly, the navigation device 100 according to this embodiment can appropriately adjust the end time of the dialogue with the driver, according to the state of the driver.

While the preferred embodiment of the disclosure has been described in detail, the disclosure is not limited to this embodiment, but the embodiment may be subjected to various modifications or changes, without departing from the principle of the disclosure stated in the appended claims.

For example, one or more (e.g., response speech analyzing function) of the functions provided in the center server 200 in the illustrated embodiment may be provided in the navigation device 100, or other information processing units.

Also, one or more of the functions provided in the navigation device 100 may be provided in the center server 200, or other information processing units. For example, the dialogue processing unit 124 may be provided in the center server 200, or other information processing units. In this case, the dialogue processing unit 124 outputs dialogue speech data representing dialogue speech in the form of questions, to the navigation device 100, so that the dialogue speech based on the dialogue speech data is output from the speaker 104 of the navigation device 100. Also, when response speech of the driver, responsive to the dialogue speech, is entered via the microphone 106 of the navigation device 100, the dialogue processing unit 124 obtains response speech data representing the response speech, from the navigation device 100.

While the navigation device 100 is used as one example of the "arousal support system" in the illustrated embodiment, the functions of the "arousal support system" may be implemented by an information processing unit (e.g., vehicle-mounted audio system, smartphone, tablet, etc.) other than the navigation device 100.

What is claimed is:

1. An arousal support device comprising:
a controller including an estimation processing unit, the controller being configured to:
output a dialogue speech in a form of a question, and obtain response speech which is a response of a driver to the dialogue speech;
measure, using the estimation processing unit, a response time from when the dialogue speech is output till the response speech is obtained;
store the measured response time in a database;
derive, using the estimation processing unit, an estimated value of wakefulness of the driver based on the measured response time and a plurality of response times previously stored in the database; and
output a signal corresponding to the estimated value to provide arousal support.

2. The arousal support device according to claim 1, wherein:
the controller is configured to derive the estimated value of wakefulness of the driver based on a reference value calculated based on the plurality of response times previously stored in the database.

3. The arousal support device according to claim 2, wherein:
the controller is further configured to calculate an average response time of the plurality of response times stored in the database as the reference value.

4. The arousal support device according to claim 1, wherein:
the controller is further configured to
extract a specified word included in the response speech; and
derive an estimated value of the wakefulness of the driver, based on a result of extraction of the specified word.

5. The arousal support device according to claim 1, wherein:
a plurality of the dialogue speeches are classified into a plurality of dialogue speech groups, according to a length of an assumed response time; and
the controller is further configured to, when the dialogue speech belonging to one of the plurality of dialogue speech groups is output to the driver, derive the estimated value of the wakefulness of the driver based on the plurality of response times previously stored in the database when the dialogue speech belonging to the one of the plurality of dialogue speech groups was output to the driver.

6. The arousal support device according to claim 1, wherein:
a plurality of the dialogue speeches are classified into a first dialogue speech or a second dialogue speech depending on whether the dialogue speech is a question that can be answered with "yes" or "no;" and
the controller is further configured to, when an output dialogue speech classified as the first dialogue speech is output to the driver, derive the estimated value of the wakefulness of the driver based on a first plurality of response times previously stored in the database when a plurality of dialogue speeches classified as the first dialogue speech corresponding to the first plurality of response times were output to the driver.

7. The arousal support device according to claim 6, wherein:
the controller is further configured to, when an output dialogue speech classified as the second dialogue speech is output to the driver, derive the estimated value of the wakefulness of the driver based on a second plurality of response times previously stored in the database when a plurality of dialogue speeches classified as the second dialogue speech corresponding to the second plurality of response times were output to the driver.

8. A method comprising:
outputting a dialogue speech in a form of a question, and obtaining response speech which is a response of a driver to the dialogue speech;
measuring, using an estimation processing unit, a response time from when the dialogue speech is output till the response speech is obtained;
storing the measured response time in a database;
deriving, using the estimation processing unit, an estimated value of wakefulness of the driver based on the measured response time and a plurality of response times previously stored in the database; and
outputting a signal corresponding to the estimated value to provide arousal support.

9. The method according to claim 8, wherein:
the deriving of the estimated value of wakefulness of the driver is based on a reference value calculated based on the plurality of response times previously stored in the database.

10. The method according to claim 9, further including:
calculating an average response time of the plurality of response times stored in the database as the reference value.

11. The method according to claim 8, further including:
extracting a specified word included in the response speech; and
deriving the estimated value of the wakefulness of the driver, based on a result of extraction of the specified word.

12. The method according to claim 8, wherein:
a plurality of the dialogue speeches are classified into a plurality of dialogue speech groups, according to a length of an assumed response time; and
the method further includes, when the dialogue speech belonging to one of the plurality of dialogue speech groups is output to the driver, deriving the estimated value of the wakefulness of the driver based on the plurality of response times previously stored in the database when the dialogue speech belonging to the one of the plurality of dialogue speech groups was output to the driver.

13. The method according to claim 8, wherein:
a plurality of the dialogue speeches are classified into a first dialogue speech or a second dialogue speech depending on whether the dialogue speech is a question that can be answered with "yes" or "no;" and the method further includes, when an output dialogue speech classified as the first dialogue speech is output to the driver, deriving the estimated value of the wakefulness of the driver based on a first plurality of response times previously stored in the database when a plurality of dialogue speeches classified as the first dialogue speech corresponding to the first plurality of response times were output to the driver.

14. The method according to claim 13, further including:
when an output dialogue speech classified as the second dialogue speech is output to the driver, deriving the estimated value of the wakefulness of the driver based on a second plurality of response times previously stored in the database when a plurality of dialogue speeches classified as the second dialogue speech corresponding to the second plurality of response times were output to the driver.

15. A non-transitory computer readable medium including instructions for arousal support, execution of the instructions causing a controller, including an estimation processing unit, to carry out a method including:
outputting a dialogue speech in a form of a question, and obtaining response speech which is a response of a driver to the dialogue speech;
measuring, using the estimation processing unit, a response time from when the dialogue speech is output till the response speech is obtained;
storing the measured response time in a database;
deriving, using the estimation processing unit, an estimated value of wakefulness of the driver based on the measured response time and a plurality of response times previously stored in the database; and
outputting a signal corresponding to the estimated value to provide arousal support.

16. The non-transitory computer readable medium according to claim 15, wherein:
the deriving the estimated value of wakefulness of the driver is based on a reference value calculated based on the plurality of response times previously stored in the database.

17. The non-transitory computer readable medium according to claim 16, wherein the method further includes:
calculating an average response time of the plurality of response times stored in the database as the reference value.

18. The non-transitory computer readable medium according to claim 15, wherein the method further includes:
extracting a specified word included in the response speech; and
deriving the estimated value of the wakefulness of the driver, based on a result of extraction of the specified word.

19. The non-transitory computer readable medium according to claim 15, wherein:
a plurality of the dialogue speeches are classified into a plurality of dialogue speech groups, according to a length of an assumed response time; and
the method further includes, when the dialogue speech belonging to one of the plurality of dialogue speech groups is output to the driver, deriving the estimated value of the wakefulness of the driver based on the plurality of response times previously stored in the database when the dialogue speech belonging to the one of the plurality of dialogue speech groups was output to the driver.

20. The non-transitory computer readable medium according to claim 15, wherein:
a plurality of the dialogue speeches are classified into a first dialogue speech or a second dialogue speech depending on whether the dialogue speech is a question that can be answered with "yes" or "no;" and
the method further includes, when an output dialogue speech classified as the first dialogue speech is output to the driver, deriving the estimated value of the wakefulness of the driver based on a first plurality of response times previously stored in the database when a plurality of dialogue speeches classified as the first dialogue speech corresponding to the first plurality of response times were output to the driver.

* * * * *